United States Patent [19]

Jones et al.

[11] Patent Number: 4,460,645
[45] Date of Patent: Jul. 17, 1984

[54] INSULATION

[75] Inventors: John C. Jones, Abernant; Anthony R. Bates, Radyr; Roland Dewsberry, Peterson Super Ely; Paul A. Ryan, Cardiff, all of Wales

[73] Assignee: University College Cardiff, Cardiff, Wales

[21] Appl. No.: 239,576

[22] Filed: Mar. 2, 1981

Related U.S. Application Data

[63] Continuation of Ser. No. 13,320, Feb. 21, 1979, abandoned.

[51] Int. Cl.³ .......................... B32B 5/16; B32B 7/08
[52] U.S. Cl. .................................... 428/323; 112/420; 428/357; 428/378; 428/403; 428/407; 428/920
[58] Field of Search .................. 428/182, 178, 72, 74, 428/379, 403, 407, 152, 388, 389, 369, 378, 164, 397, 920, 400; 427/217, 222, 212; 112/420

[56] References Cited

U.S. PATENT DOCUMENTS

| | | | |
|---|---|---|---|
| 2,091,918 | 8/1937 | Flack | 428/182 |
| 2,102,233 | 12/1937 | Biedeman | 428/72 |
| 2,768,420 | 10/1956 | Runton | 428/74 |
| 2,851,390 | 9/1958 | Chavannes | 428/166 |
| 3,577,305 | 5/1971 | Itines | 428/178 |
| 3,655,502 | 4/1972 | Yoshikawa | 428/152 |
| 3,769,770 | 11/1973 | Deschamps et al. | 428/403 |
| 4,042,737 | 8/1977 | Forsgren | 428/378 |

FOREIGN PATENT DOCUMENTS 2553781  6/1977  Fed. Rep. of Germany ........ 428/74

Primary Examiner—Paul J. Thibodeau
Attorney, Agent, or Firm—Weingarten, Schurgin, Gagnebin & Hayes

[57] ABSTRACT

This invention relates to insulation materials and, in particular, to thermal insulation materials having heat reflective properties.

In particular insulation material according to the invention comprises a random array of elements as herein defined having at least a portion thereof deformed so as to increase the resilience of the elements and to assist in forming spaces between adjacent elements in the random array.

In this specification the term element is used to include filaments of different cross-sectional shape, for example, circular, square or rectangular, strips of uniform or non-uniform width and/or thickness, flakes and platelets of regular or irregular geometric shape and of uniform or non-uniform thickness, and the like.

17 Claims, 3 Drawing Figures

INSULATION

This is a continuation, of application Ser. No. 013,320, filed Feb. 21, 1979, now abandoned.

This invention relates to insulation materials and, in particular, to thermal insulation materials having heat reflective properties.

Various insulation materials are known including a mat or blanket of glass fibre, rockwool or foamed plastics materials but these materials possess certain disadvantages. For example, foamed plastics materials such as foamed polystyrene is readily inflammable unless expensive fire retardent materials are included in the initial component mix. These conventional materials depend in large part for their insulative properties upon restricted air movement whereas the insulation materials according to this invention possess the additional feature of heat reflection.

As to glass fibres and rockwool, these both create tendencies to produce irritation to the eyes and skin of an operator. Furthermore, it is understood that glass fibre may also create internal irritation in the nasal channels and lungs of an operator unless the operator wears a proper mask.

It is an object of the present invention to provide an insulating material which overcomes or substantially reduces the disadvantages attendant upon the above discussed insulation materials.

According to the present invention there is provided an insulation material comprising a random array of elements (as hereindefined) having at least a portion thereof deformed so as to increase the resilience of the element and to assist in forming spaces between adjacent elements in the random array.

Throughout this specification the term element is used to include filaments of different cross-sectional shape, for example, circular, square or rectangular, strips of uniform or non-uniform width and/or thickness, flakes and platelets of regular or irregular geometric shape and of uniform or non-uniform thickness, and the like. The elements may be made from metallised (which naturally have a surface oxide layer) or unmetallised, natural or synthetic sheet material foil or film. Examples of metallised elements are metallised polyester, metallised p.v.c. or metallised paper e.g. fire resistant paper. If desired, a mixture of metallised and unmetallised materials may be used.

Deformation may be achieved by stretching a portion of an element beyond its elastic limit, by corrugating the whole or a part, e.g. an edge region of an element, by dimpling, crinkling or perforating.

Where film or foil is used, which may, as mentioned, be metallised or unmetallised, sheets thereof may be shredded and deformation may be applied prior to, during or subsequent to shredding. Where metallised or unmetallised film or foil is used, we have found that the physical properties thereof are such that corrugations are naturally produced along one or both edges of a strip-like element formed when the film or foil is passed through a conventional shredding machine. Further, by varying the thickness of the film or foil, the width of the strip-like element and the degree of crinkling, the physical properties of the element can be varied. Such conventional paper shredding machines are known and widely used for destroying documents, and elements produced thereby have the advantage that they possess good resilience or recovery properties when crushed and they occupy a relatively large volume. The metallised coating may be aluminium or any other suitable metallic material. The thickness of the metallised coating may be up to 1 micron, the film or foil substrate of thickness up to 50 microns and the width of shredded elements may be as little as 7 microns and as much as 1 cm.

We have found that the thermal conductance of a 5 cms thick sample of 300 Å aluminised 12$\mu$ p.v.c. with an element width of 1 mm at a packing density of 7.5 kg/m$^3$, is 1.04 W/m$^{2\circ}$C. For an unmetallised sample of the same overall thickness, element width and packing density, the thermal conductance is 30% greater than that of the metallised sample which clearly illustrates the benefit of heat reflecting surfaces.

We have also found that the thermal conductance of a 5 cms thick sample of fireproofed newspaper with an element width of 1 mm at a packing density of 50 kg/m$^3$ is 0.92 W/m$^{2\circ}$C. When enclosed in a 300 Å aluminised 25$\mu$ p.v.c. cover or envelope the conductance is reduced to 0.90 W/m$^{2\circ}$C.

These insulation values compare with thermal conductance of a 5 cms thick sample of glassfibre mat which has a conductance of 1.02 W/m$^{2\circ}$C. and still further improved thermal conductance values using insulation according to the invention are obtained when the widths of the elements are reduced below 1 mm.

The insulating material according to this invention may be used for insulating roof spaces and cavity wall space for domestic and other buildings and may also be used as a filling for movable and fixed partition units.

Furthermore, the aluminised plastic elements are a very effective radiation reflecting barrier, having an infra-red reflectance value of more than 95%. Since the heat lost by radiation is more than half of the total heat lost by a human body to the environment under still air conditions, the metallised plastic filaments are very effective at reducing body heat loss, and can be used for thermally insulating clothing.

By control of the production process, the properties of the resilient insulating aggregate of aluminised elements can be varied to suit particular applications (viz, longer elements yield an intertwined matting having handle and drape qualities suitable for direct use as a filling in the manufacture of insulating clothing). Shorter elements yield a product which has similar flow properties to down so that a blowfill process could be used, for example, in the maintenance of sleeping bags.

The thermal conductance of a 5 cms sample of 300 Å aluminised 12$\mu$ p.v.c. with an element width of 1 mm at a packing density of 7.5 kg/m$^3$ is 1.02 W/m$^{2\circ}$C. compared favourably with the conductance of the same overall thickness of pure duck down which is 1.11 W/m$^{2\circ}$C., a down/feather mixture which has a conductance of 1.32 W/m$^{2\circ}$C. and the polyester fibres which has a conductance of 1.40 W/m$^{2\circ}$C.

One advantage of the insulation material of the invention compared with down and other alternatives is that the manufacturer need not stock large stocks of bulky material. He can reduce his storage space by keeping compact rolls of aluminised plastic film and forming the elements as required on his premises. The manufacturer also has a versatile operation in that he can adjust the type of plastic film used to comply with customer needs and legislative requirements.

The material can be incorporated in a protective infra-red transparent envelope, or individual elements may be coated to enable it to withstand different washing conditions. The feel of the material can be improved by lubricating the elements with conventional fabric softeners and lubricants, such as Dow Corning "Fibre Fill"(registered trademark) treatment.

Furthermore, the elements may be used as a filter in quilted or non-quilted garments such as anoraks and other types of clothing. The elements may also be used as a filling material for sleeping bags. In such cases the elements have the advantage as opposed to most conventional padding material, that they are non-hygroscopic.

Conventionally items of clothing or bedding are frequently quilted in order to maintain a reasonably even distribution of a filling material, for example, down, throughout the item. Conventional quilting processes require a considerable degree of care when locating the filling material and are consequently time consuming and expensive. Various quilting patterns and methods of quilting are known but, in general, they all include nodal regions where the stitching passes completely through the quilted item. In some cases there is no insulation or filling at the nodal regions which consist of two superimposed layers of covering material. In other cases, the insulation or filling material is heavily compressed at the nodal regions thereby considerably reducing any insulative effect and producing "cold-spots".

We have found that these so-called nodal regions or cold spots can be avoided by producing a sub-assembly comprising a layer of insulating material overlaid upon and stitched to a layer of natural or synthetic fabric. The stitching may follow any desired pattern and on that side of the insulation remote from the layer of fabric, the stitching passes through an array of tapes which conform to the desired stitching pattern. The tapes afford means for reinforcing the lines of stitching and also serves to retain the insulation in position. This process is repeated and the sub-assemblies so-stitched are superimposed upon one another—insulation to insulation—and finally hemmed along the perimeter to form a quilted item. In such a construction the elements of the insulation of each component naturally become entangled thereby preventing separation of the two assemblies. If desired, and as a safeguard against separation the two items may be stitched to one another at intervals.

Preferably, the lines of stitching for quilting are parallel to one another and at right angles to the general direction of insulation elements laid down upon the layer of fabric. When two such sub-assemblies are superimposed to form a quilted assembly the lines of stitching in the two sub-assemblies are disposed at right angles to each other.

We have found that using the same mass of elements per unit area of material, (20 g per square foot) and quilting it by different techniques a varied loft and insulation value is obtained. Straight through perpendicularly stitched quilting with a quilt spacing of 3 inches yields a material with a loft of 16 mm and has a conductance of 3.03 W/m$^2$°C. By the second method of perpendicularly stitched double side quilting with the same quilt spacing, a loft of 24 mm is obtained with a conductance of 2.18 W/m$^2$°C. This clearly illustrates the benefit of the double sided quilting technique.

Although specific reference has been made above to the case where filaments are produced by shredding and are therefore in the form of ribbons, the material is not restricted to such sections. A layer of elements may be used as a filling between two sheets of rigid material which may or may not possess thermal insulating and heat reflective properties. Alternatively, the elements may be used to fill pockets of fabric and thereby form flexible sheets of insulating material.

Although the elements may be produced by shredding, they may also be produced by end or side cutting strips from a roll of film (or foil) mounted on a lathe or rotatable spindle. The strip may be continuous or discontinuous as desired.

It is also possible to treat a flat element (i.e. undeformed) by heat treatment to produce curling and a random array of such elements possesses inherent resilience.

The invention also includes building materials, articles of clothing and bedding incorporating the insulation material described.

The thermal insulation material according to the invention and a quilted article containing the same will now be described with reference to the accompanying drawings in which.

Figure 2:
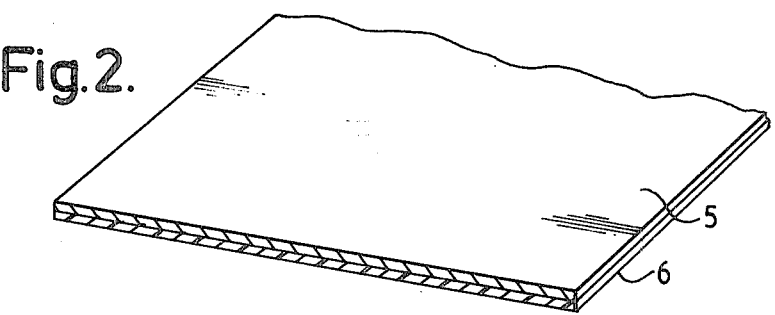
FIG. 2 is a perspective of laminated sheet material from which the thermal insulation is produced.

In the laminated sheet of FIG. 2, reference 5 represents a sheet of material such as polyester, polyvinyl chloride or paper which is metalized with a sheet of metallic foil or film 6. The sheet of metallic foil or film 6 may be applied to the sheet 5 as a metallised coating as described above. The laminated sheet of FIG. 2 constitutes the feedstock from which individual resilient elements 7 (see FIG. 3) having considerable greater length then width are produced, for example, by the shredding technique noted above.

Figure 3:
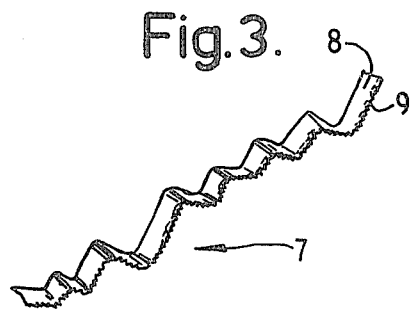
FIG. 3 is a schematic perspective of an individual resilient element, a random array of a plurality of such individual resilient elements forming the filling of insulation material used in the article of FIG. 1.

The individual resilient elements 7 have a face thereof metallised, for example face 8 (FIG. 3) and an edge portion 9 is deformed. Deformation of the edge portion 9 may take one of several forms, namely, corrugations, dimples, crinkles or perforations. In FIG. 3 the edge portion 9 is corrugated.

Figure 1:
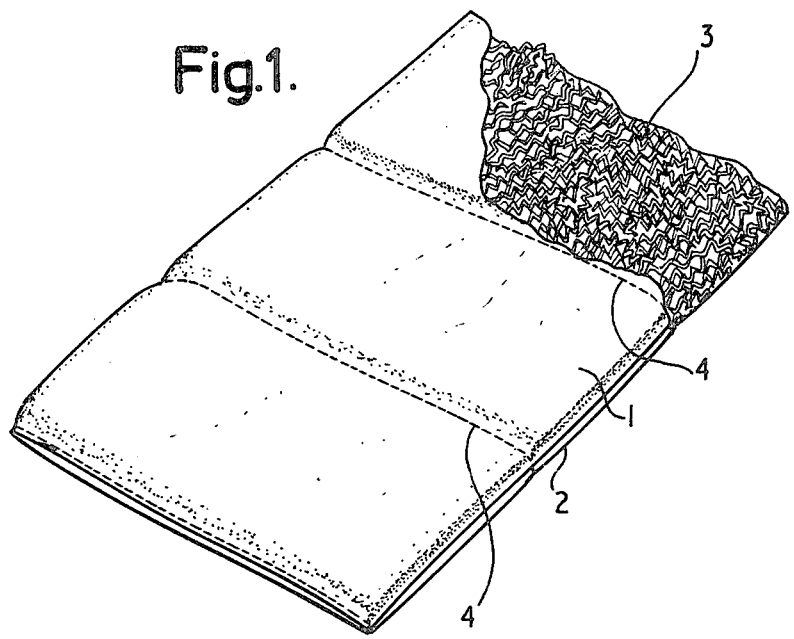
FIG. 1 is a perspective of a quilted article having a portion of a covering layer removed to reveal a filling of thermal insulation material.

The quilted article shown in FIG. 1 has an upper covering 1 and a lower covering 2 between which is sandwiched a layer of insulation material 3 comprising an array of resilient elements 7 of FIG. 3 but for the sake of clarity, reference number 7 is not shown in FIG. 1. The article is stitched along lines 4 with the lines passing through the article to produce a quilting effect.

What we claim is:

1. A thermal insulation material comprising an aggregate array of resilient elements forming a thermally insulative resilient mass with said elements being at least loosely packed together in random relationship with respect to each other, said elements being formed as fragmented and separated sheet material, said sheet material being selected from the group consisting of natural and synthetic material having a metallised coating on at least one surface thereof, said elements having a non-circular cross-section, and formed in shapes selected from the group consisting of strips, flakes and platelets, said non-circular cross-sectioned strips, flakes and platelets having geometric shapes which are selectively regular and irregular, and having selected uniform and non-uniform thicknesses and widths, said elements having at least one major face thereof metallized, each of said elements having at least a portion including an edge portion thereof deformed so as to increase the resilience thereof and facilitate the formation of spaces between adjacent ones of said elements in said array, the form of the deformation being selected from the group consisting of corrugation, dimples, crinkles and perforations.

2. An insulation material according to claim 1 wherein the elements are made from metallized polyester, metallized p.v.c. or metallized paper.

3. An insulation material according to any one of claims 1 and 2 wherein the elements are deformed by corrugating at least a part of one edge region.

4. An insulation material according to any one of claims 1 and 2 wherein each element has a thickness of up to 1 mm and a width up to 1 cm.

5. An insulation material according to claim 1 wherein the elements are heat treated to deform the element.

6. A thermal insulating article comprising:
a layer of material defining a sheet; and
a layer of insulation material physically retained spacially adjacent said sheet comprising an aggregate array of resilient elements forming a thermally insulative resilient mass with said elements being at least loosely packed together in random relationship with respect to each other, said elements being formed as fragmented and separated sheet material, said sheet material being selected from the group consisting of natural and synthetic material having a metallised coating on at least one surface thereof, said elements having a non-circular cross-section and formed in shapes selected from the group consisting of strips, flakes and platelets, said non-circular cross-sectioned strips, flakes and platelets having geometric shapes which are selectively regular and irregular, and having selected uniform and non-uniform thicknesses and widths, said elements having at least one major face thereof metallized, each of said elements having at least a portion including an edge portion thereof deformed so as to increase the resilience thereof and facilitate the formation of spaces between adjacent ones of said elements in said array, the form of the deformation being selected from the group consisting of corrugation, dimples, crinkles and perforations.

7. An article according to claim 6 wherein the layer of material is a textile material.

8. An article according to claim 6 wherein the insulation material and the layer of material are affixed to each other by stitching or by an adhesive.

9. An article of clothing incorporating a layer of insulation material in accordance with any one of claims 1, 2, 5 and 6.

10. An article of bedding for example sleeping bag or duvet having therein a layer of insulation material according to any one of claims 1, 2, 5 and 6.

11. An article according to claim 6 wherein the sheet of material is self-supporting and is made for plastics materials, timber, plasterboard or metal.

12. An article according to either claim 6 or 11 wherein the layer of insulation material is sandwiched between two sheets.

13. A method of making a thermally insulating quilted article including the steps of:
1. producing two sub-assemblies each comprising a layer of insulation material overlayed upon and stitched to a sheet of fabric according to claim 6;
2. superimposing the sub-assemblies upon one another with one of said insulation material abutting the other of said insulation material; and
3. securing the superimposed sub-assemblies to each other.

14. A method according to claim 13 wherein the stitching in each sub-assembly follows a pattern of parallel lines.

15. A method according to claim 14 wherein the parallel lines of stitching of one sub-assembly are disposed at right angles to the lines of stitching of the superimposed sub-assembly.

16. A method according to claim 14 wherein the stitching on each sub-assembly passes through an array of tapes which conform to the desired stitching pattern.

17. A method according to claim 14 wherein each of the layers of insulation material is overlayed upon the layer of fabric in a direction at right angles to the intended lines of stitching.

* * * * *

UNITED STATES PATENT AND TRADEMARK OFFICE
CERTIFICATE OF CORRECTION

PATENT NO. : 4,460,645
DATED : July 17, 1984
INVENTOR(S) : John C. Jones et al

It is certified that error appears in the above—identified patent and that said Letters Patent is hereby corrected as shown below:

Column 3, line 5, "used as a filter" should read --used as a filler--.

Column 4, line 62, "metallised" should read --premetalized--.

Column 5, line 5, "of spaces" should read --of thermally insulative spaces--;

line 33, "metallised" should read --premetalized--;

line 45, "of spaces" should read --of thermally insulative spaces--.

Signed and Sealed this

Second Day of April 1985

[SEAL]

Attest:

DONALD J. QUIGG

Attesting Officer      Acting Commissioner of Patents and Trademarks